Patented Nov. 15, 1949

2,488,472

UNITED STATES PATENT OFFICE 2,488,472

PROCESS OF DECARBOXYLATING ORTHO- AND PARA-HYDROXY BENZOIC ACIDS

Roland E. Kremers, Summit, N. J., assignor to General Foods Corporation, Hoboken, N. J., a corporation of Delaware No Drawing. Application March 27, 1945, Serial No. 585,197

18 Claims. (Cl. 260—624)

The present invention relates to a process for the decarboxylation of ortho- and para-hydroxy benzoic acids, and more particularly the invention relates to the production of desirable phenolic compounds from such acids. The acid treated may be mono-hydroxy or di-hydroxy and may contain substituent groups which are non-functional in the decarboxylation reaction. For example, the invention is particularly applicable for the decarboxylation of acids of the anacardic acid series which are hydroxy-benzoic acids having relatively long saturated or unsaturated side chains.

The principal object of this invention is to provide an efficient and economical method of decarboxylating an organic acid of the type described so that said acid is substantially completely converted into a phenolic compound without undesirable side reactions occurring during said decarboxylation.

Another object of this invention is to provide a method for the production of phenolic compounds of high purity from acids of the anacardic acid series by the catalytic removal of carbon dioxide from the carboxyl group of the acid, which method avoids the formation of products resulting from the application of relatively high heat.

Still another object is to provide a method of decarboxylating cashew nut shell liquid containing anacardic acid to produce a liquid having the anacardic acid largely converted into anacardol and containing substantially no polymerization products of anacardol as the result of the decarboxylation process.

A still further object of this invention is to provide new phenolic compounds by the catalytic decarboxylation of hydroxy aromatic acids of the anacardic acid series.

Reference to the prior art shows that at 230° C. salicylic acid is partially decarboxylated and self-esterified to form salol. In the decarboxylation of organic acids of the above-mentioned type, however, a large excess of alkali over that required to form a salt of the acid has been generally added, and reliance is placed upon the large excess of alkali and upon destructive temperatures to bring about the desired reaction in accordance with the following equation:

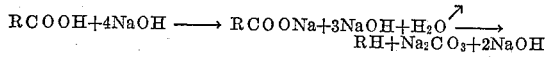

It is also well known that, although cashew nut shell liquid as it exists in the cashew nut shell contains a large percentage of anacardic acid, the cashew nut shell liquids of commerce have until recently contained only a relatively small amount of anacardic acid. This due to the decomposition of at least the greater portion of the anacardic acid by the high temperatures utilized in the extraction of the liquid from the cashew shells. Recently, modern methods of extraction have made commercially available a cashew nut shell liquid having a relatively high anacardic acid content corresponding to that present in the shells. As a result, anacardic acid is available in quantity, and products can be made from it which cannot be obtained as satisfactorily from the previously available cashew nut shell liquids.

Anacardic acid is known to lose carbon dioxide when subjected to a sufficiently high heat, leaving as a residue the phenol, known as anacardol, and by-products of the reaction. Anacardol was probably produced by the heat treatment to which the previously available cashew nut shell liquids were subjected in the process of extraction. However, the portion of the liquid which originally was not anacardic acid also consisted largely of phenolic substances; and the resultant mixture of phenols was difficult to separate into its constituents, and, in addition, was contaminated with ash materials and with polymerization or other undesired products.

Relatively pure anacardic acid is very resistant to the action of heat and to remove carbon dioxide from the molecule requires a temperature in the vicinity of 200° C. or above. At these temperatures, the reaction is not simple and the product is contaminated with by-products. For instance, in addition to decarboxylation, dehydration can take place with the doubling up of molecules in a structure similar to the salol structure. Also, polymerization is induced because of the unsaturated nature of the side chain of the anacardic acid molecule.

In accordance with the present invention, it has been found that substantially pure phenols may be prepared from an ortho- or para-hydroxy benzoic acid by a method which comprises mixing such an acid with a relatively small amount of material which furnishes an alkali or alkaline earth metal compound soluble in said acid, and heating the mixture to decarboxylate the acid. In the specification and claims, magnesium is included in the term "alkaline earth metal."

The alkali or alkaline earth metal compounds which are employed as catalysts in accordance with the present invention may either be mixed as such with the acid, or, where the compound is the alkali or alkaline earth metal salt of the acid to be decarboxylated, it may be formed in situ by the admixture with the acid of a material such as an alkali or alkaline earth metal oxide or hydroxide under conditions suitable for the formation of the alkali or alkaline earth metal salt of the acid. Thus, for example, in the catalytic decarboxylation of anacardic acid, a small proportion of alkali or alkaline earth metal anacardate, acetate or the like may be mixed with the acid and the mixture heated to decarboxylate the acid; or a small proportion of alkali or alkaline earth metal oxide or hydroxide may be mixed with the acid in the presence of water and the mixture heated to decarboxylate the acid. Where an alkaline earth metal oxide or hydroxide is employed to form the alkaline earth metal salt of the acid, a small proportion of water should be present to assist the formation of the salt of the acid.

The alkali or alkaline earth metal compounds soluble in the acid which may be employed as catalysts in accordance with the present invention are preferably the highly soluble salts of the various organic acids such as the anacardates (neutral or basic) the acetates, lactates, salicylates or the like, but if so desired, the less soluble salts such as calcium chloride and magnesium chloride may be used. Since the alkali metal or alkaline earth metal oxides and hydroxides react, when a small amount of water is present, with the acid to form the alkali metal or alkaline earth metal salt thereof which is soluble in the acid, the addition of such oxide or hydroxide is the preferred embodiment of the invention and of these compounds the use of slaked lime is preferred. The insoluble or very sparingly soluble salts, such as calcium carbonate, calcium sulphate, strontium chloride, barium chloride and sodium chloride are ineffective from a practical standpoint. Where reference is made in the specification and claims to the solubility of the alkali or alkaline earth metal compound, the solubility in the particular acid which is to be decarboxylated is meant, and while the present invention is not to be limited to any particular theory of operation, the indications are that the catalytic effect is due to the presence of the alkali or alkaline earth metal ion in the acid to be decarboxylated.

As previously pointed out, the process of the present invention is applicable for the decarboxylation of the various acids of the ortho- and para-hydroxy benzoic acid series to form corresponding phenolic compounds. In the case of di-hydroxy benzoic acids, at least one of the hydroxyl groups is ortho or para to the carboxyl group. As examples, the mono-hydroxy acids such as salicylic acid and p-hydroxy benzoic acid, and the di-hydroxy acids, such as protocatechuic acid, pyrocatechuic acid and beta-resorcylic acid may be mentioned. The acids may contain various alkyl, alkylene, acyl, or aralkyl substituent groups which are non-functional in the decarboxylation reaction. The following are illustrative of the members of the salicylic acid series which have such non-functional substituents and which may be decarboxylated in accordance with the present invention: 6-methyl salicylic acid (6-hydroxy-o-toluic acid); ortho-cresotinic acid (3-methyl salicylic acid); metacresotinic acid (4-methyl salicylic acid); para-cresotinic acid (5-methyl salicylic acid); 5-ethyl salicylic acid; 4,6-dimethyl salicylic acid; 4,5-dimethyl salicylic acid; 5,6-dimethyl salicylic acid; 3,5-dimethyl salicylic acid; 3-propyl salicylic acid; 5-propyl salicylic acid; 3-isopropyl salicylic acid; 5-isopropyl salicylic acid; 4-isopropyl salicylic acid; 3-methyl-5-ethyl salicylic acid; 3,5,6-trimethyl salicylic acid; 3,4,6-trimethyl salicylic acid; 5-tert.-butyl salicylic acid; 6-methyl-3-isopropyl salicylic acid; 4-methyl-3-isoamyl salicylic acid; 4-isopropenyl salicylic acid; 3,5-diisopropyl salicylic acid; 3-propenyl salicylic acid; 3-allyl salicylic acid; 4-methyl-3-allyl salicylic acid; 3-methyl-5-allyl salicylic acid; 3,5-diallyl salicylic acid; syringic acid; pelandjauic acid; anacardic acid; isoanacardic acid (2-hydroxy-4-pentadecadienyl benzoic acid); isotetrahydroanacardic acid; and tetrahydroanacardic acid; cyclogallipharic acid (reported in the literature to be identical with tetrahydroanacardic acid); and ginkgolic acid.

The acids to be decarboxylated may also contain inorganic substituents which are non-functional in the decarboxylation reaction, such as chlorine, bromine, or iodine atoms, or a single nitro group, for example, the mono-, and di-bromo anacardic and tetrahydroanacardic acids may be decarboxylated in accordance with the present invention. Obviously, other ortho- and para-hydroxy benzoic acids than those specifically mentioned are applicable for treatment in accordance with the present invention.

As previously pointed out, the process of the present invention is particularly applicable for the decarboxylation of acids of the anacardic acid series. This term, "acids of the anacardic acid series," as used herein includes those acids which have a hydroxyl group, a carboxyl group and a straight side chain attached to a benzene ring as in anacardic acid and in which hydrogen atoms or other atoms or groups non-functional to the decarboxylation, such as a halogen atom, a nitro group or a hydrocarbon substituent group, are attached to the other carbon atoms of the benzene ring, the number of carbon atoms in said side chain corresponding to the number of carbon atoms in the side chain of anacardic acid. Thus, not only are anacardic acid and isoanacardic acid and their non-functional derivatives included within the term, but also tetrahydroanacardic acid, isotetrahydro anacardic acid, cyclogallipharic acid, ginkgolic acid and their non-functional derivatives. The phenols produced upon the decarboxylation of the acids of the anacardic acid series are termed herein "phenols of the anacardol series." As above pointed out, the decarboxylation of anacardic acid results in the phenol, anacardol; and the decarboxylation of other acids of the anacardic acid series yields corresponding anacardols; thus, tetrahydroanacardic acid yields tetrahydroanacardol; mono-nitro-tetrahydroanacardic acid yields mono-nitro-tetrahydroanacardol; di-bromo-tetrahydroanacardic acid yields di-bromo-tetrahydroanacardol; etc.

When a relatively pure phenolic compound is desired as the result of the process, the acid treated is relatively pure, but when the purity of the phenolic compound obtained is not of moment, materials containing the acid and other substances may be subjected to the process. For example, if desired, the method of the present invention may be used in the treatment of cashew nut shell liquid containing anacardic acid to convert said acid into anacardol. In such case, the resulting anacardol is associated with the other materials which were present in the original cashew nut shell liquid. If the cashew nut shell liquid, treated in accordance with the process of the present invention, is cashew nut shell liquid produced by extraction at non-decomposition temperatures, for example, one containing at least 40% anacardic acid, then, after the addition of the alkali metal or alkaline earth metal compound soluble in the anacardic acid, the cashew nut shell liquid, when decarboxylated in accordance with the process of the invention, has its anacardic acid content substantially entirely converted into anacardol without the formation of other conversion products of its anacardic acid content.

In carrying out the process of the present invention, the alkali metal or alkaline earth metal compound soluble in the acid to be decarboxylated is uniformly mixed with the acid, and the mixture is heated to a temperature sufficient to cause the evolution of carbon dioxide from the acid. If the acid treated is solid at ordinary temperatures but has a melting point lower than the temperature at which it is decarboxylated in accordance with the present invention, it may be advantageous to melt it by the application of heat before or after the compound is mixed therewith so that uniform distribution of the oxide or hydroxide in the acid may be assured. Generally, the temperature employed to produce a reasonable rate of decarboxylation will not be less than 100° C. However, the temperature at which a reasonably rapid rate of decarboxylation occurs will depend upon the acid being decarboxylated and upon the particular alkali metal or alkaline earth metal compound employed as a catalyst. Also, an increase in temperature will increase the rate of decarboxylation with any given acid. Since the presence of the alkali metal or alkaline earth metal compound decreases the temperature at which a satisfactory rate of decarboxylation is obtained, the temperature employed may advantageously be substantially below that required to decarboxylate the particular acid in the absence of the catalyst of the present invention. The degree to which the temperature may be raised above that at which the decarboxylation will occur at a reasonably rapid rate is not critical, but no advantage is to be gained in raising the temperature thereabove, whereas the tendency toward side reactions increases as the temperature is increased. In the case of acids of very high melting points, the catalytic effect is shown, not so much by a lowering of the temperature at which carbon dioxide evolution is first apparent, as by the very rapid rate at which the carbon dioxide is evolved when the acid begins to melt. In the case of anacardic acid, tetrahydroanacardic acid, and the mono- and di-bromo derivatives thereof, I have found a temperature between about 100° C. and 150° C. to be satisfactory although it is frequently advantageous to raise the temperature to about 180° C. toward the end of the treatment to insure substantially complete evolution of the carbon dioxide. In the case of lower molecular weight acids of the salicylic acid series, a somewhat higher temperature is preferable, e. g., a temperature between about 170° C. and 185° C. In the case of certain relatively stable acids, such as p-hydroxy benzoic acid, a still higher temperature is recommended, namely, a temperature from about 210° C. to 220° C. or higher.

As pointed out, the amount of alkali metal or alkaline earth metal compound soluble in the acid to be decarboxylated employed in the decarboxylation process is relatively small. In the following, while amounts of $Ca(OH)_2$ are given as exemplary, it is to be understood that when an alkali metal or alkaline earth metal compound other than $Ca(OH)_2$ is employed, an amount thereof having an alkali metal or alkaline earth metal content stoichiometrically equivalent to the calcium content of the percentages of $Ca(OH)_2$ given will be calculated and employed. Generally, when $Ca(OH)_2$ is the catalyst, the amount of such material employed will be between about 0.1% and 5%, preferably between about 0.5% and 5%, by weight based on the weight of the acid treated, an amount between about 1% and 2% being usually employed. However, the amount employed may exceed 5% if desired, although amounts in excess of about 2% are not recommended since they generally do not increase the efficiency of the treatment and represent a loss of material. It is to be noted that, when lime (or other alkali metal or alkaline earth metal oxide or hydroxide) is employed to furnish the compound soluble in the acid, the amount added is well below the amount required to neutralize the acid in contrast to the prior method hereinabove discussed; 10.7% by weight of lime being the amount required to produce the neutral calcium anacardate. The smaller the amount of alkali metal or alkaline earth metal oxide or hydroxide employed, so long as there is sufficient present to exert a catalytic effect, the more efficient will be the decarboxylation process, since any portion of such a catalyst which remains combined with the anacardic acid at the end of the reaction, tends to stabilize the acid with which it is combined at the temperature at which the process is conducted.

After the decarboxylation of the acid, the phenol produced may be separated from the metal salt by any convenient means, for example, by filtration or by extraction of the phenol with an organic solvent such as hexane and the like. If desired, any salt remaining in solution in the phenol may be removed therefrom by known methods, for example, by treatment of the phenol with a suitable acid.

The following Table I illustrates the decarboxylation of 90% anacardic acid using various materials furnishing an alkali metal or alkaline earth metal compound soluble in the acid. The acid and catalyst were thoroughly mixed and heated to the decarboxylation temperature shown in the table, and the volume of the gas evolved was measured and recorded at suitable intervals. From the number of cubic centimeters of carbon dioxide recorded at each, reading the rates of decarboxylation, expressed in cubic centimeters of carbon dioxide per gram of acid per hour, were calculated.

*Table I*

| Material Added | Per Cent Material Added | Per Cent $H_2O$ Present | Decarboxylation Temp. °C. | Rate cc./g./hr. |
|---|---|---|---|---|
| None | 0 | 2 | 180 | 13 |
| $Ca(OH)_2$ | 1 | 2 | 140 | 72 |
| Do | 2 | 2 | 140 | 96 |
| Do | 1 | 1 | 140 | 104 |
| Do | 1 | 4 | 140 | 90 |
| Ca Anacardate (neutral) | [1] 5 | 0 | 140 | 41 |
| Ca Anacardate (basic) | [2] 5 | 0 | 140 | 68 |
| Do | [1] 2.5 | 0 | 140 | 34 |
| Ca Acetate.$H_2O$ | [1] 1 | 0 | 140 | 41 |
| $CaCl_2.2H_2O$ | [1] 1 | 0 | 140 | 30 |
| Ca Lactate.$5H_2O$ | [1] 2 | 0 | 140 | 20 |
| $Mg(OH)_2$ | [2] 1 | 1 | 140 | 32 |
| $Sr(OH)_2.8H_2O$ | [2] 3.5 | 1.9 | 140 | 96 |
| $Ba(OH)_2.8H_2O$ | [2] 4.0 | 1.9 | 140 | 90 |
| KOH | [2] 2 | 1.7 | 140 | 86 |
| NaOH | [2] 1 | 1 | 140 | 59 |
| Mg Acetate.$4H_2O$ | [2] 3 | 1 | 140 | 27 |
| Ca Acetate.$H_2O$ | [2] 2 | 1 | 140 | 132 |
| Sr Acetate.$1/2H_2O$ | [2] 3 | 1.2 | 140 | 106 |
| Ba Acetate.$H_2O$ | [2] 3.5 | 1.3 | 140 | 98 |
| K Acetate | [2] 2.5 | 1 | 140 | 73 |
| Na Acetate | [2] 2 | 1 | 140 | 32 |
| $MgCl_2.6H_2O$ | [2] 2.5 | 1.4 | 140 | 34 |
| $CaCl_2.2H_2O$ | [2] 2 | 0.5 | 140 | 34 |

[1] Material equivalent to 0.5% $Ca(OH)_2$.
[2] Material equivalent to 1.0% $Ca(OH)_2$.

In Table II, the results obtained in the manner described above, are set forth with respect to tetrahydroanacardic acid, cashew nut shell liquid containing 54% anacardic acid, salicylic acid, mono- and di-bromo tetrahydroanacardic acid.

Table II

| Acid | Material Added | Per Cent Material Added | Per Cent H₂O Present | Decarboxylation Temp., °C. | Rate cc./g./hr. |
|---|---|---|---|---|---|
| Tetrahydro Anacardic Acid | Ca(OH)₂ | 0.5 | .2 | 140 | 50 |
| Do | do | 1 | .2 | 140 | 104 |
| Do | do | 2 | .2 | 140 | 134 |
| Do | do | 5 | .2 | 140 | 234 |
| Do | Ca Acetate | ¹1.2 | 0 | 140 | 64 |
| Do | Ca(OH)₂ | 1 | 2 | 160 | 560 |
| Do | do | 0.25 | 1.2 | 140 | 43 |
| Cashew Nut Shell Liquid | do | 0.5 | 1.2 | 140 | 42 |
| Do | do | 1 | 1.2 | 140 | 60 |
| Do | do | 1 | 2 | 170 | 24 |
| Salicylic Acid | do | 1 | 2 | 140 | 63 |
| Mono-Bromo Tetrahydro Anacardic Acid | do | 1 | 2 | 140 | 45 |
| Dibromo Tetrahydro Anacardic Acid | do | | | | |

¹ Material equivalent to ½% lime.

Table III shows the amount of CO₂ evolved from anacardic acid during 3½ hours at a temperature of 125° C. using a number of bases as sources of catalysts.

Table III

| Material Added | CO₂ Evolved | |
|---|---|---|
| | Gms. CO₂ per 100 gms. Acid | Percent of Theory |
| None | 0.07 | 0.6 |
| Calcium Hydroxide, 2% | 10.9 | 85 |
| Strontium Hydroxide, 2% | 10.7 | 83.5 |
| Barium Hydroxide, 2% | 12.1 | 94.5 |
| Magnesium Oxide, 2% | 6.5 | 50.7 |
| Potassium Hydroxide, 2% | 6.7 | 52.3 |

The theoretically possible evolution of CO₂ from anacardic acid is 12.8%. A slightly longer period of heating or a higher temperature, as compared to those employed in the experiments set forth in the table increase the efficiency of the decarboxylation. As the above table shows, under the same conditions of heating, but without a catalyst, less than 1% of the theoretically possible quantity of CO₂ was lost by the anacardic acid.

The following specific examples will serve to illustrate and explain the present invention:

*Example 1*

Taking calcium hydroxide is a typical source of catalyst, a quantity of freshly slaked, finely powdered lime in the neighborhood of 2% of the weight of the anacardic acid to be treated is added to the acid. Care is taken to disperse the base uniformly throughout the acid. The mixture is then heated to 100° C. or somewhat higher, and the progress of the decarboxylation reaction can be observed by the amount and rate of which carbon dioxide gas is evolved. Time and temperatures are mutually compensating factors in their effect on the reaction. A heating bath temperature of 120° C. – 130° C. is usually employed except where a minimum time allotment is important, where slightly higher temperatures, i. e., up to about 150° C., will be used.

Any calcium remaining in solution may be removed by known methods employing the necessary quantity of such acids as sulphuric, hydrochloric, acetic, or oxalic, etc.

*Example 2*

Tetrahydroanacardol is made by heating tetrahydroanacardic acid with 2% of slaked lime based on the weight of the acid, for about 3½ hours at a temperature of 125° C. It is separated from the calcium-containing residues by extraction with hexane. Distillation of the solvent leaves a white, crystalline phenol (tetrahydroanacardol) having a melting point of 51° C.

*Example 3*

Di-bromo-tetrahydroanacardic acid is prepared by dissolving tetrahydroanacardic acid in a suitable solvent and brominating the acid with the proper amount of bromine to cause the formation of di-bromo-substitution product having a melting point of 99° C. to 100° C. and the following structural formula:

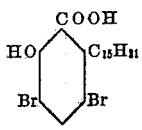

The above formula shows that the two bromine atoms occupy the two available positions to which they are directed by the influence of the three original substituents of the benzene ring.

1.0 gram of the above-described di-bromo-tetrahydroanacardic acid is then decarboxylated by heating it with 0.020 g. of calcium hydroxide for 3 hours at a temperature of 130° C.–135° C. The mixture is then dissolved in hexane and filtered from the calcium compounds. Evaporation of the solvent leaves 0.8 g. of di-bromo-tetrahydroanacardol having a melting point before recrystallization of 52° C. to 54° C., and a melting point after recrystallization of 55.0° C. to 55.8° C. The 0.8 g. of the final product represents a 91% yield of very nearly pure material.

The difficulty of trying to convert tetrahydroanacardol directly to a pure di-bromo-substitution product is evident from a consideration of the structural formula for this phenol:

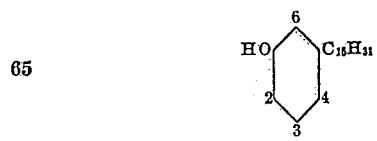

Of the four positions on the benzene ring which are still open, the OH and the C₁₅H₃₁ groups would direct bromine into three, namely, the 2, 4, and 6 positions. Any quantity of bromine short of that sufficient to form the tri-bromide would, therefore, tend to distribute itself between all three positions. Even if it were possible to limit the reaction to the di-bromide stage, there still are three possible, isomers, namely, the 2,4, and the 2,6, and the 4,6 derivatives. Thus, in the simplest case, the operator would be confronted with a mixture of substances which would probably be difficult to separate. The simplicity of result obtainable by the indirect method is obvious, and this illustrates the advantage of being able to conduct certain reactions with the acid first and then decarboxylating.

The mono-bromo tetrahydroanacardic acid having a melting point of 84 to 84.5° C. may likewise be formed by the use of the correct amount of bromine and the mono-bromo-tetrahydroanacardic acid may be also decarboxylated as above described to form mono-bromo tetrahydroanacardol having a melting point of from 64 to 65.5° C.

The di-bromo tetrahydroanacardic acid and the bromo tetrahydroanacardols are novel products. The bromo tetrahydroanacardic acid products are useful as dyestuff intermediates and as intermediates for the preparation of their salts, such as the sodium salts, which are useful as wood preservatives. The bromo tetrahydroanacardol products are useful as dyestuff intermediates and as insecticides.

*Example 4*

Mono-nitro-tetrahydroanacardol having the following probable structural formula:

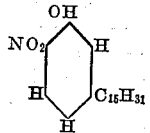

is prepared from mono-nitro-tetrahydroanacardic acid by the decarboxylation procedure described above in Example 2, except that, since the nitro group stabilizes the carboxyl group, a somewhat higher temperature is required, i. e. in the neighborhood of 180° C. or higher, but caution must be exercised since the compound, like many nitro compounds, tends to undergo explosive decomposition.

The mono-nitro-tetrahydroanacardic acid may be prepared by dispersing 15 grams of tetrahydroanacardic acid in 100 ml. of sulphuric acid (density, 183) at 0° C. A solution of 3 ml. of nitric acid (density, 1.4) in 12 ml. of sulphuric acid is then slowly added over a period of thirty minutes while the solution is agitated thoroughly and maintained below 5° C. by cooling. The mono-nitro-tetrahydroanacardic acid is precipitated by pouring the mixture into several volumes of water. The suspension is then filtered and the solid is dried. The yield amounts to 13.8 grams (82%) of mono-nitro-tetrahydroanacardic acid which after recrystallization from hexane melts at 75° C.–77° C.

The nitro-tetrahydroanacardic acid and the corresponding mono-nitro-tetrahydroanacardol are novel products. The nitro-tetrahydroanacardic acid is useful as a dyestuff intermediate and as an intermediate for the preparation of salts such as sodium salts which are useful as wood preservatives and insecticides. The mono-nitro-tetrahydroanacardic acid is also useful in the preparation of amino derivatives for use in pharmaceuticals. Mono - nitro - tetrahydroanacardol is useful as a dyestuff intermediate and as an insecticide.

The preparation of the mono-nitro-tetrahydro- anacardol by the decarboxylation of the mono-nitro-tetrahydroanacardic acid has the same advantages as were pointed out in the preceding example in connection with the preparation of the bromo-anacardols.

*Example 5*

Salicylic acid is decarboxylated by heating the acid with 1% (by weight of the acid) of slaked lime at a temperature ranging from 170° C. to 185° C. until the reaction is complete, as evidenced by cessation of evolution of carbon dioxide gas. The residue when cooled to room temperature assumes the typical crystalline structure of phenol.

As previously stated, salicylic acid is known to partially decarboxylate and self-esterify at temperatures of 230° C., or more, forming salol or phenyl salicylate. This esterification is absent, or at the most unappreciable, in the method of the present invention, which yields an end product consisting substantially of phenol.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claims.

I claim:

1. A method for decarboxylating an acid selected from the group consisting of mono- and di-hydroxy acids of the ortho- and para-hydroxy benzoic acid series, which comprises mixing with said acid a compound selected from the group consisting of the alkali metal and alkaline earth metal compounds soluble in said acid, the said compound being employed in an amount not substantially greater than that providing an alkali or alkaline earth metal content stoichiometrically equivalent to the calcium content of about 5% calcium hydroxide based on the weight of the said acid, and heating said mixture to decarboxylate said acid.

2. A method of decarboxylating an acid selected from the group consisting of mono- and di-hydroxy acids of the ortho- and para-hydroxy benzoic acid series, which comprises mixing with said acid, in the presence of water, a compound selected from the group consisting of the alkali metal and alkaline earth metal oxides and hydroxides, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

3. A method of decarboxylating an acid selected from the group consisting of mono- and di-hydroxy acids of the ortho- and para-hydroxy benzoic acid series, which comprises mixing with said acid a compound selected from the group consisting of the alkali metal and alkaline earth metal salts of organic acids, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

4. A method of decarboxylating an acid selected from the group consisting of mono- and di-hydroxy acids of the ortho- and para-hydroxy benzoic acid series, which comprises mixing with said acid an alkaline earth metal salt of an organic acid, the said alkaline earth metal salt being employed in an amount not substantially greater than that providing an alkaline earth metal content stoichiometrically equivalent to the calcium content of about 5% calcium hydroxide based on the weight of the acid, and heating said mixture to decarboxylate said acid.

5. A method of decarboxylating an acid selected from the group consisting of mono- and di-hydroxy acids of the ortho- and para-hydroxy benzoic acid series, which comprises mixing with said acid, in the presence of water, a compound selected from the group consisting of calcium oxide and calcium hydroxide, the said compound being employed in an amount not substantially greater than that providing a calcium content stoichiometrically equivalent to that of about 5% calcium hydroxide based on the weight of the acid, and heating said mixture to decarboxylate said acid.

6. A method of decarboxylating an acid selected from the group consisting of mono- and di-hydroxy acids of the ortho- and para-hydroxy benzoic acid series, which comprises mixing with said acid a calcium salt of an organic acid, the said salt being employed in an amount not substantially greater than that providing a calcium content stoichiometrically equivalent to that of about 5% calcium hydroxide based on the weight of the acid, and heating said mixture to decarboxylate said acid.

7. A method of decarboxylating an acid of the anacardic acid series, which comprises mixing with said acid a compound selected from the group consisting of the alkali metal and alkaline earth metal compounds soluble in said acid, the said compound being employed in an amount not substantially greater than that providing an alkali or alkaline earth metal content stoichiometrically equivalent to the calcium content of about 5% calcium hydroxide based on the weight of the said acid, and heating said mixture to decarboxylate said acid.

8. A method of decarboxylating an acid of the anacardic acid series, which comprises mixing with said acid, in the presence of water, a compound selected from the group consisting of the alkali metal and alkaline earth metal oxides and hydroxides, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

9. A method of decarboxylating an acid of the anacardic acid series, which comprises mixing with said acid a compound selected from the group consisting of the alkali metal and alkaline earth metal salts of organic acids, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

10. A method of decarboxylating an acid of the anacardic acid series, which comprises mixing with said acid an alkaline earth metal salt of an organic acid, the said alkaline earth metal salt being employed in an amount not substantially greater than that providing an alkaline earth metal content stoichiometrically equivalent to the calcium content of about 5% calcium hydroxide based on the weight of the acid, and heating said mixture to decarboxylate said acid.

11. A method of decarboxylating an acid of the anacardic acid series, which comprises mixing with said acid, in the presence of water, a compound selected from the group consisting of calcium oxide and calcium hydroxide, the said compound being employed in an amount not substantially greater than that providing a calcium content stoichiometrically equivalent to that of about 5% calcium hydroxide based on the weight of the acid, and heating said mixture to decarboxylate said acid.

12. A method of decarboxylating an acid of the anacardic acid series, which comprises mixing with said acid a calcium salt of an organic acid, the said salt being employed in an amount not substantially greater than that providing a calcium content stoichiometrically equivalent to that of about 5% calcium hydroxide based on the weight of the acid, and heating said mixture to decarboxylate said acid.

13. A method of decarboxylating cashew nut shell liquid containing anacardic acid to convert said anacardic acid to anacardol, which comprises mixing with said acid a compound selected from the group consisting of the alkali metal and alkaline earth metal compounds soluble in said acid, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

14. A method of decarboxylating cashew nut shell liquid containing anacardic acid to convert said anacardic acid to anacardol, which comprises mixing with said acid, in the presence of water, a compound selected from the group consisting of the alkali metal and alkaline earth metal oxides and hydroxides, the said compound being employed in an amount not substantially greater than that providing an alkali or alkaline earth metal content stoichiometrically equivalent to the calcium content of about 5% calcium hydroxide on the weight of the acid, and heating said mixture to decarboxylate said acid.

15. A method of decarboxylating cashew nut shell liquid containing anacardic acid to convert said anacardic acid to anacardol, which comprises mixing with said acid a compound selected from the group consisting of the alkali metal and alkaline earth metal salts of organic acids, the said compound being employed in an amount not substantially greater than that providing an alkali or alkaline earth metal content stoichiometrically equivalent to the calcium content of about 5% calcium hydroxide based on the weight of the acid, and heating said mixture to decarboxylate said acid.

16. A method of decarboxylating cashew nut shell liquid containing anacardic acid to convert said anacardic acid to anacardol, which comprises mixing with said acid an alkaline earth metal salt of an organic acid, the said alkaline earth metal salt being employed in an amount not substantially greater than that providing an alkaline earth metal content stoichiometrically equivalent to the calcium content of about 5% calcium hydroxide based on the weight of the acid, and heating said mixture to decarboxylate said acid.

17. A method of decarboxylating cashew nut shell liquid containing anacardic acid to convert said anacardic acid to anacardol, which comprises mixing with said acid, in the presence of water, a compound selected from the group consisting of calcium oxide and calcium hydroxide, the said compound being employed in an amount not substantially greater than that providing a calcium content stoichiometrically equivalent to that of about 5% calcium hydroxide based on the weight of the acid, and heating said mixture to decarboxylate said acid.

18. A method of decarboxylating cashew nut shell liquid containing anacardic acid to convert said anacardic acid to anacardol. which comprises mixing with said acid a calcium salt of an organic acid, the said salt being employed in an amount not substantially greater than that providing a calcium content stoichiometrically equivalent to that of about 5% calcium hydroxide based on the weight of the acid, and heating said mixture to decarboxylate said acid.

ROLAND E. KREMERS.

REFERENCES CITED

The following references are of record in the file of this patent:

UNITED STATES PATENTS

| Number | Name | Date |
|---|---|---|
| 2,098,824 | Harvey | Nov. 9, 1937 |
| 2,218,531 | Harvey | Oct. 22, 1940 |
| 2,402,940 | Berry | July 2, 1946 |

FOREIGN PATENTS

| Number | Country | Date |
|---|---|---|
| 144,897 | Great Britain | June 24, 1920 |
| 81,070 | Austria | Aug. 10, 1920 |

OTHER REFERENCES

Chemical Abstracts, vol. 37, columns 1394-5 (1943).

Chemical Abstracts, vol. 29, column 6588 (1935).

Certificate of Correction

November 15, 1949

Patent No. 2,488,472

ROLAND E. KREMERS

It is hereby certified that error appears in the printed specification of the above numbered patent requiring correction as follows:

Column 9, line 51, for "(density, 183)" read *(density, 1.83)*; and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*